United States Patent
Muto et al.

(10) Patent No.: US 9,358,904 B1
(45) Date of Patent: Jun. 7, 2016

(54) VEHICULAR SEAT ADJUSTMENT APPARATUS AND METHODS OF USE AND MANUFACTURE THEREOF

(71) Applicant: Honda Motor Co., Ltd., Tokyo (JP)

(72) Inventors: Noriyuki Muto, Raymond, OH (US); Tsuyoshi Kumasaka, Raymond, OH (US); Robert T. Wilson, III, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/634,339

(22) Filed: Feb. 27, 2015

(51) Int. Cl.
*B60N 2/07* (2006.01)

(52) U.S. Cl.
CPC ............ *B60N 2/0732* (2013.01); *B60N 2/0722* (2013.01); *B60N 2/0727* (2013.01)

(58) Field of Classification Search
CPC .............. B60N 2/02; B60N 2/04; B60N 2/06; B60N 2/0702; B60N 2/0705; B60N 2/071; B60N 2/0715; B60N 2/072; B60N 2/0722; B60N 2/0725; B60N 2/0732; B60N 2/0735; B60N 2/073; B60N 2/0747
USPC .............................. 296/65.13, 65.14; 248/429
See application file for complete search history.

(56) References Cited

U.S. PATENT DOCUMENTS

| | | | | |
|---|---|---|---|---|
| 4,515,404 A | * | 5/1985 | Nishimura ............ | B60N 2/0705 248/429 |
| 4,733,845 A | * | 3/1988 | Maiwald ............... | B60N 2/0705 248/420 |
| 4,948,189 A | * | 8/1990 | Terada .................. | B60N 2/0715 248/429 |
| 5,275,370 A | | 1/1994 | Terai | |
| 5,286,076 A | * | 2/1994 | DeVoss ................. | B60N 2/0705 248/429 |
| 5,364,152 A | * | 11/1994 | Mastrangelo ........... | B60N 2/305 396/65.03 |
| 5,855,350 A | * | 1/1999 | Volker .................. | B60N 2/0705 248/430 |
| 5,868,450 A | * | 2/1999 | Hashimoto ........... | B60N 2/3011 296/65.09 |
| 6,257,642 B1 | * | 7/2001 | Schumann ............. | B60N 2/015 248/429 |
| 6,299,121 B1 | * | 10/2001 | Brault ................. | B60N 2/01508 248/429 |
| 6,354,553 B1 | * | 3/2002 | Lagerweij ............. | B60N 2/0715 248/429 |
| 6,443,414 B1 | | 9/2002 | Horsfield et al. | |
| 6,488,249 B1 | | 12/2002 | Girardi et al. | |
| 6,488,250 B1 | * | 12/2002 | Munch ................. | B60N 2/0715 248/430 |

(Continued)

FOREIGN PATENT DOCUMENTS

CN 201105666 Y 8/2008

*Primary Examiner* — Gregory Blankenship
(74) *Attorney, Agent, or Firm* — Kenealy Vaidya LLP

(57) ABSTRACT

Some embodiments are directed to a vehicular seat adjustment mechanism for facilitating positional adjustments of a vehicular seat along a longitudinal direction of a vehicle. The vehicular seat adjustment mechanism includes a pair of rails that extend substantially parallel to a longitudinal direction of the vehicle. Each of the rails defines an opening that faces a lower surface of the vehicle. A pair of support legs are configured to be secured to a vehicular frame. Each of the support legs is secured to and supports one of the rails. A mounting plate supports the vehicular seat and is configured to be movable along the pair of rails. A pair of supports are each secured to one of the rails and configured to support the mounting plate and facilitate longitudinal movement of the mounting plate along the rails.

17 Claims, 11 Drawing Sheets

(56) References Cited

U.S. PATENT DOCUMENTS

| | | | | |
|---|---|---|---|---|
| 6,767,040 B1 * | 7/2004 | Freijy | ............... | B60N 2/3031 |
| | | | | 296/65.09 |
| 6,772,985 B2 * | 8/2004 | Lee | ............... | B60N 2/071 |
| | | | | 248/424 |
| 6,827,388 B2 * | 12/2004 | Kayumi | ............... | B60N 2/01 |
| | | | | 296/64 |
| 6,945,505 B2 | 9/2005 | Hohnl et al. | | |
| 7,213,862 B1 * | 5/2007 | Martin | ............... | B60R 25/014 |
| | | | | 180/287 |
| 7,669,825 B2 * | 3/2010 | Sung | ............... | B60N 2/0825 |
| | | | | 248/424 |
| 7,735,798 B2 * | 6/2010 | Kojima | ............... | B60N 2/0843 |
| | | | | 248/419 |
| 7,926,862 B2 * | 4/2011 | Smith | ............... | B60N 2/005 |
| | | | | 296/64 |
| 8,196,887 B2 | 6/2012 | Dahlbacka et al. | | |
| 8,490,940 B2 | 7/2013 | Ito et al. | | |
| 8,556,348 B2 * | 10/2013 | Glaser | ............... | B60N 2/688 |
| | | | | 296/65.09 |
| 8,579,351 B2 * | 11/2013 | Takakura | ............... | B60N 2/06 |
| | | | | 296/65.05 |
| 8,632,043 B2 | 1/2014 | Dahlbacka et al. | | |
| 8,991,778 B2 * | 3/2015 | Koller | ............... | B60N 2/01525 |
| | | | | 248/429 |
| 9,004,437 B2 * | 4/2015 | Yamada | ............... | B60N 2/682 |
| | | | | 248/429 |
| 2005/0099041 A1 * | 5/2005 | Becker | ............... | B60N 2/002 |
| | | | | 297/217.2 |
| 2005/0184550 A1 * | 8/2005 | Jung | ............... | B60N 2/0705 |
| | | | | 296/65.13 |
| 2006/0049682 A1 * | 3/2006 | Yamanaka | ............... | B60N 2/065 |
| | | | | 297/452.18 |
| 2008/0238127 A1 * | 10/2008 | Kojima | ............... | B60N 2/0705 |
| | | | | 296/65.13 |
| 2010/0090082 A1 * | 4/2010 | Kojima | ............... | B60N 2/0818 |
| | | | | 248/429 |
| 2012/0318949 A1 * | 12/2012 | Braun | ............... | B60N 2/07 |
| | | | | 248/429 |
| 2014/0167483 A1 * | 6/2014 | Schneider | ............... | B60N 2/06 |
| | | | | 297/463.1 |
| 2014/0265416 A1 * | 9/2014 | Pequignot, II | ............... | B60N 2/0856 |
| | | | | 296/65.14 |

* cited by examiner

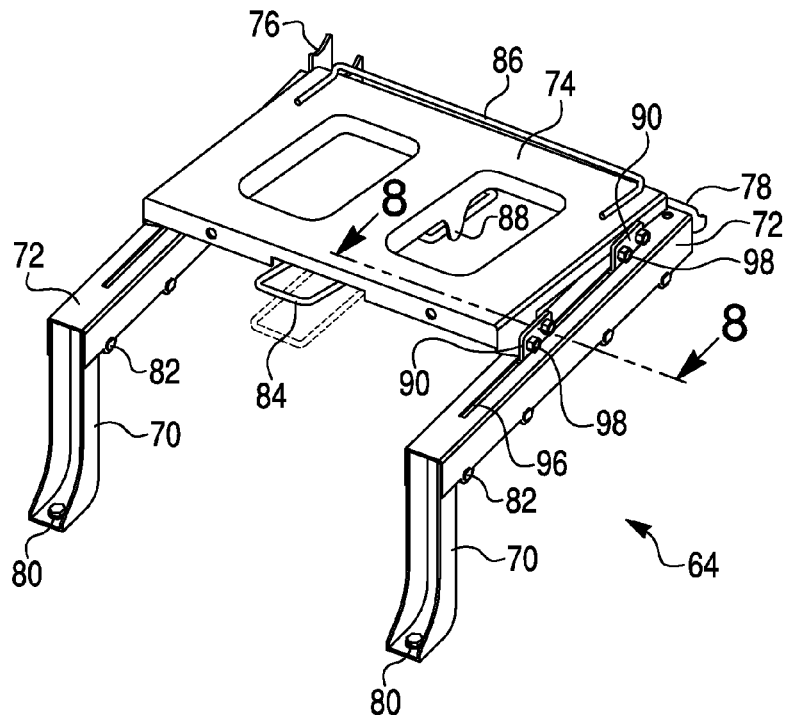
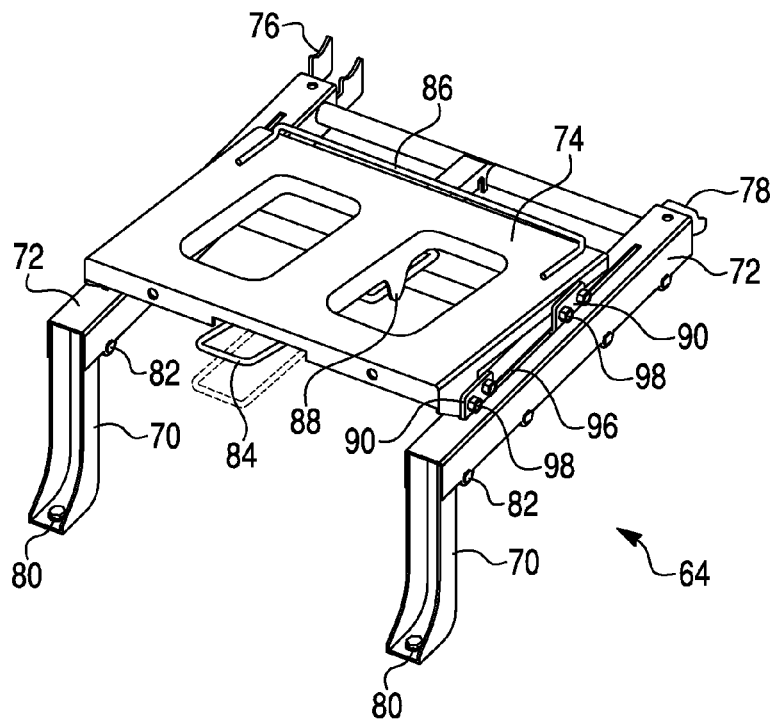

VEHICULAR SEAT ADJUSTMENT APPARATUS AND METHODS OF USE AND MANUFACTURE THEREOF

BACKGROUND

The disclosed subject matter relates to methods and apparatus for adjusting vehicular seats. More particularly, the disclosed subject matter relates to adjustable vehicular seat assemblies, components for adjusting vehicular seats, methods of adjusting vehicular seats, and methods of manufacturing adjustable vehicular seat assemblies and components for adjusting vehicular seats.

Vehicles can be provided with various systems and apparatus for adjusting the seats of vehicular occupants. For example, it may be beneficial to adjust the incline defined between upper and lower seat portions, such as between 90 degrees (with the passenger sitting straight up) and 180 degrees (with the passenger lying flat). The overall tilt of the seat (including both the upper and lower seat portions) can also be adjusted, thereby directing the overall angle of orientation of the passenger's body.

In addition, vehicular seats can be adjustable in a longitudinal direction of the vehicle, such as toward and away from the front of the vehicle. This front and rear adjustment may be especially beneficial because it enables passengers of different sizes to be accommodated. For example, a relatively large passenger may desire to sit in a relatively rearward position, while a relatively forward position may be desirable for a relatively small passenger.

SUMMARY

Passengers may be desirous of this type of forward and rearward adjustment for various reasons, such as to facilitate comfort. For example, a relatively large passenger may be more comfortable with the seat in a relatively rearward position based on an increased amount of space accessible to the passenger, such as by the increased open space defined between the vehicle seat and a front of the vehicular interior, e.g., the dashboard, glove compartment, etc. Contrarily, a relatively small passenger may achieve the same amount or type of comfort when disposed in a relatively forward position.

This type of forward and rearward adjustment may also enhance the user's operation of the vehicle. For example, a relatively small passenger may need to place the seat in a relatively forward position to enable access to the vehicular controls, such as the steering wheel, acceleration and brake pedals, sound and climate systems, etc. Contrarily, a relatively larger passenger may desire or need the seat to be in a relatively rearward position to enable the same access to the vehicular controls.

Various mechanisms and components can be used to enable or facilitate forward and rearward adjustment of vehicular seats, including bearings, grease, etc. Many of these mechanisms operate acceptably in a substantially closed environment, such as within a relatively controlled passenger compartment, e.g., vehicles configured for travel along an improved path including but not limited to passenger cars, minivans, trucks, etc. These environments are relatively controlled, and typically the vehicular seat adjusting mechanisms disposed therein are not subjected to contact with a large amount of dirt, mud, water, debris, dust, etc., originating from an exterior of the vehicle.

However, certain types of vehicles do not provide or otherwise include passenger compartments that are controlled to the degree disclosed above. For example, the passenger compartments of vehicles that are specialized for use on an unimproved path or an unmarked path, such as those commonly referred to as multipurpose utility vehicles (MUV) or as side-by-side all-terrain vehicles (S×S, or S×S ATV) may be more exposed to the vehicular exterior, and thus components disposed therein may be subjected to contact, and in some cases significant contact, with a large amount of dirt, mud, water, debris, dust, etc. This contact may be increased or exacerbated by the environment in which these vehicles are designed to operate, i.e., unimproved or unmarked paths. In other words, travel along these types of paths may tend to increase the amount of dirt, mud, water, debris, dust, etc., that ultimately enters the passenger compartment.

Some of the components of the vehicular seat adjustment mechanisms disclosed above, such as bearings, grease, etc., may be negatively affected by contact with certain amounts of dirt, mud, water, debris, etc. This negative impact may be manifested in various respects, such as by the seat adjustment mechanisms sticking or locking, and/or their capability of providing smooth movement otherwise being impeded or eroded.

It may therefore be beneficial to provide vehicular seat adjustment mechanisms that are relatively resilient to contact with certain amounts of dirt, mud, water, debris, dust, etc., such as amounts that may be evidenced during operation of vehicles that are specialized for use on unimproved or unmarked paths. Embodiments are intended to include or otherwise cover many different types of methods and apparatus for providing or otherwise equipping the vehicular seat adjustment mechanisms with this type of resiliency. In some of these embodiments, this resiliency is provided by configuring one or more components of the seat adjustment mechanisms to facilitate displacement of the dirt, mud, water, debris, dust, etc., away from all or part(s) of the adjustment mechanisms. Some of these embodiments are configured to perform this operation via gravity, such as by utilizing component(s) that have open bottoms to enable the dirt, mud, water, debris, dust, etc., to naturally fall away or otherwise be displaced from the seat adjustment mechanisms.

Some embodiments are therefore directed to a vehicular seat adjustment mechanism for facilitating positional adjustments of a vehicular seat along a longitudinal direction of a vehicle. The vehicular seat adjustment mechanism can include a pair of rails that extend substantially parallel to a longitudinal direction of the vehicle. Each of the rails can define an opening that faces a lower surface of the vehicle. A pair of support legs can be configured to be secured to the vehicular frame. Each of the support legs can be secured to and support one of the rails. A mounting plate can support the vehicular seat and be configured to be movable along the pair of rails. A pair of supports can each be secured to one of the rails and configured to support the mounting plate and facilitate longitudinal movement of the mounting plate along the rails.

Some other embodiments are directed to a vehicular seating and adjusting system that includes a vehicular seat and a vehicular seat adjustment mechanism for facilitating positional adjustments of the vehicular seat along a longitudinal direction of a vehicle. The vehicular seat adjustment mechanism can include a pair of rails that extend substantially parallel to a longitudinal direction of the vehicle. Each of the rails can define an opening that faces a lower surface of the vehicle. A pair of support legs can be configured to be secured to the vehicular frame. Each of the support legs can be secured to and support one of the rails. A mounting plate can support the vehicular seat and be configured to be movable along the pair of rails. A pair of supports can each be secured to one of the rails and configured to support the mounting plate and facilitate longitudinal movement of the mounting plate along the rails.

Still other embodiments are directed to a method of manufacturing a vehicular seat adjustment mechanism that is configured to facilitate positional adjustments of a vehicular seat along a longitudinal direction of a vehicle. The method can include: extending a pair of rails substantially parallel to the longitudinal direction of the vehicle; configuring each of the rails to define an opening that faces a lower surface of the vehicle; securing a pair of support legs to a vehicular frame; supporting the rails with the support legs; supporting the vehicular seat with a mounting plate that is configured to be movable along the pair of rails; securing each of a pair of supports to one of the rails; and configuring the supports to support the mounting plate and to facilitate longitudinal movement of the mounting plate along the rails.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 4 is a perspective view of the exemplary seat adjustment mechanism of FIG. 2 in a relatively rearward position.

FIG. 5 is a perspective view of the exemplary seat adjustment mechanism of FIG. 2 in a relatively forward position.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
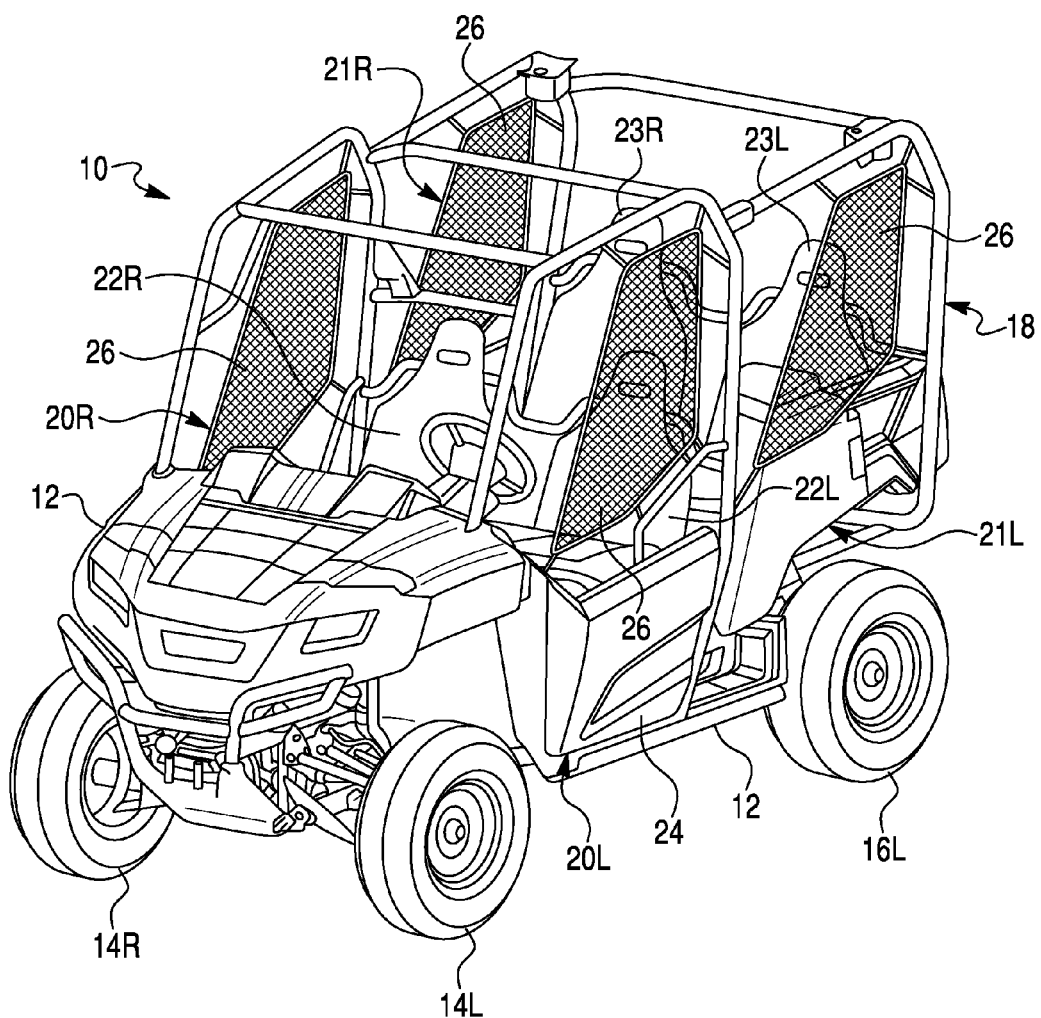
FIG. 1 is a perspective view of an exemplary vehicle that may be equipped with a seat adjustment mechanism in accordance with the disclosed subject matter.

FIG. 1 is a perspective view of an exemplary vehicle 10 that may be equipped with a seat adjustment mechanism in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (S×S, or S×S ATV).

However, the disclosed seating and restraint system with seat belt assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc. In fact, embodiments are intended to include or otherwise cover configurations of the seating and restraint system with seat belt assembly for use in any other type of vehicle, such as an aircraft, boat, ship, train, spacecraft, etc. Some other embodiments can be used in non-vehicular applications, such as for amusement park rides, playground apparatus, or any other situation where a seating and restraint system can enhance outcomes subsequent to transmission of a force.

Figure 2:
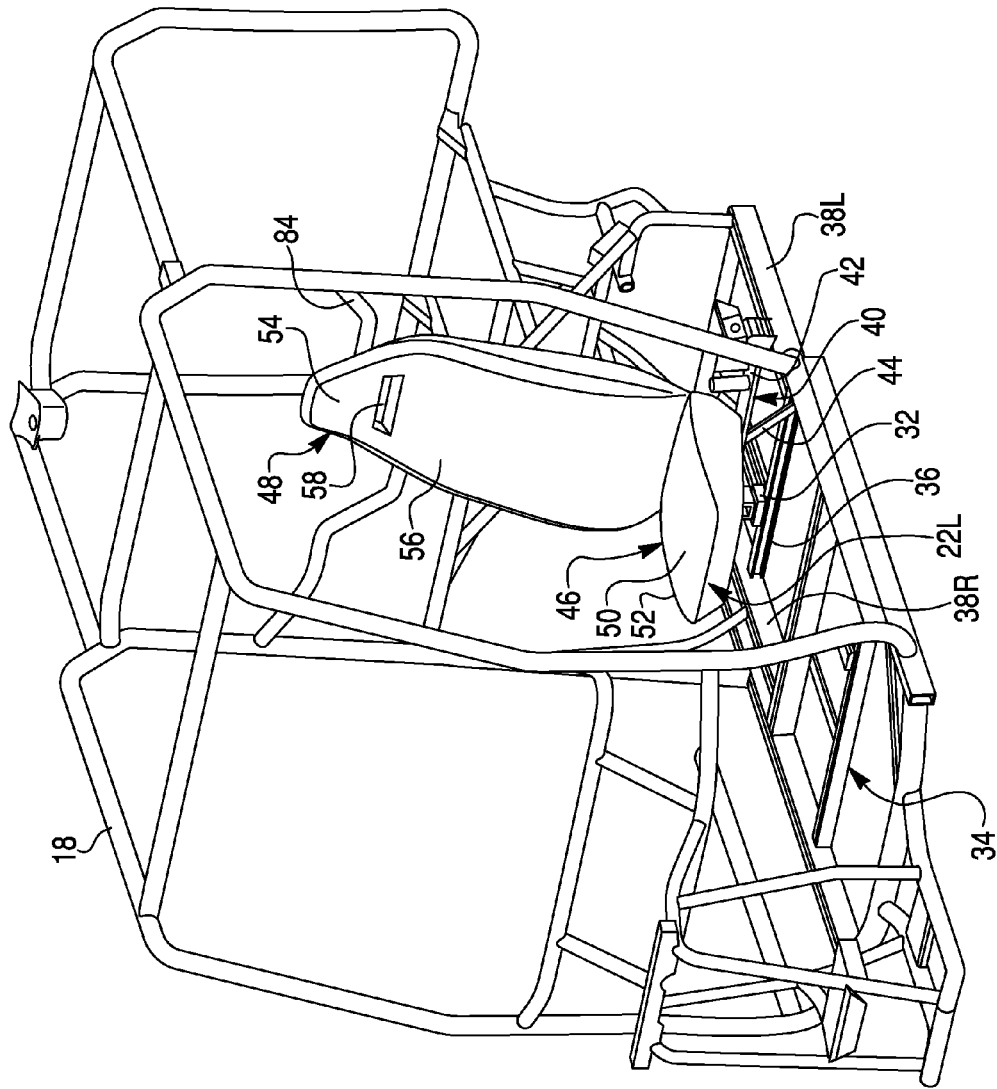
FIG. 2 is a perspective view of the vehicle of FIG. 1 in a partially assembled state, showing components of an exemplary seat adjustment mechanism in accordance with the disclosed subject matter.

The vehicle 10 can include a body 12, a pair of front wheels, 14L, 14R, a pair of rear wheels 16L, 16R (the right-side rear wheel 16R is obstructed from view), a roll cage 18, a pair of front door assemblies 20L, 20R, a pair of rear door assemblies 21L, 21R, a frame assembly, and a powertrain. The frame assembly is hidden from view in FIG. 1 by the body 12 (but portions thereof are shown in FIG. 2), and the powertrain is omitted from FIG. 1 for simplicity and clarity of the drawing.

The vehicle 10 can include a pair of front seats 22L, 22R and a pair of rear seats 23, 23R mounted in a passenger area of the vehicle 10. The roll cage 18 can be configured to extend around and above the seats 22L, 22R, 23L, 23R and the passenger area. The roll cage 18 can cooperate with the body 12 and/or at least a portion of the frame assembly to define a pair of door openings through which a passenger may pass in order to enter or exit the passenger area.

The door assemblies 20L, 20R, 21L, 21R can each include a door 24 and window panel assembly 26, and can be configured to selectively open and close access through the door openings by moving between a closed position and a fully opened position. In the closed position, the door assemblies 20L, 20R can span the respective door openings to obstruct access to the passenger area via the door openings. In the closed position, the front portion of each door assembly 20L, 20R can be latched to the roll cage 18. The fully opened position can be any position where the door assemblies 20L, 20R are pivoted away from the respective door openings to provide substantially unobstructed access to the passenger area via the door openings. FIG. 1 shows the door assemblies 20L, 20R in the closed position.

Sq II. Seat Assembly

FIG. 2 is a perspective view of the vehicle 10 shown in FIG. 1 in a partially-assembled state. In FIG. 2, the body 12 and the right-side seat 22R vehicle 10, along with other features, are omitted for simplicity and clarity of FIG. 2. It is to be understood that the right-side seat 22R can be connected to the vehicle 10 and can interact with other components as described below with reference to the left-side seat 22L.

As shown in FIG. 2, the seat 22L can include a lower seat portion 46 (also referred to as a seat bottom) and an upper seat portion 48 (also referred to as a seat back). However, embodiments are intended to include or otherwise cover other types of seats, including seats that do not necessarily define discrete lower and upper portions. For example, some embodiments are directed to seats that include a single unitary or integral structure.

The lower seat portion 46 can include a seat horizontal surface 50 configured to support a passenger's lower body portion. However, this surface does not need to be horizontal, and embodiments are intended to include or otherwise cover surfaces that extend at any angle and that are otherwise capable of supporting a passenger or certain parts of the passenger's body. The lower seat portion 46 also can include a lower seat perimeter extension (also referred to as a hip bolster) that can extend around at least a portion of the perimeter of the seat horizontal surface 50. The lower seat perimeter extension can enhance passenger stability and/or comfort. However, embodiments are intended to include other alternative structures, as well as seats 22L that do not include this feature at all.

The upper seat portion 48 can include a seat vertical surface 54 configured to support a passenger's upper body portion. However, this surface does not need to be vertical, and embodiments are intended to include or otherwise cover surfaces that extend at any angle and that are otherwise capable of supporting a passenger or certain parts of the passenger's body. The upper seat portion 48 also can include an upper seat perimeter extension (also referred to as a side bolster) that extends around at least a portion of the perimeter of the seat vertical surface 54. The upper seat perimeter extension can be configured to enhance passenger stability and/or comfort. However, embodiments are intended to include other alternative structures, as well as seats 22L that do not include this feature at all.

III. Seat Support Structure

The seat 22L can be used with or otherwise include a seat slider assembly 64 (shown in FIG. 3) that supports the seat 22L and enables the seat 22L to be adjusted along a longitudinal direction of the vehicle 10. Embodiments are intended to include or otherwise cover any structure for connecting components of the seat slider assembly 64 to any relevant part of the vehicle 10 to provide support for the seat slider assembly 64 (and thereby support for the seat 22L). In the embodiment shown in FIG. 2, components of the seat slider assembly 64 are connected to a vehicle frame 34 so as to enable the seat 22L to be movable relative to the frame 34, such between a plurality of lockable positions along the vehicle's longitudinal axis.

As discussed in more detail below, the seat slider assembly 64 includes a pair of support legs 70 that support a pair of rails 72, and a mounting plate 74 that is movable longitudinally along the rails 72. The mounting plate 74 supports the seat 22L, and the support legs 70 and rails 72 support the mounting plate 74 by virtue of their connection to the vehicle frame 34.

As shown in FIG. 2, the vehicle frame 34 can include frame cross-bars 32 and 36, and longitudinally extending frame members 38L, 38R. The longitudinally extending frame members 38L, 38R can extend generally parallel to each other, and the frame cross-bars 32 and 36 can extend generally perpendicular thereto. Opposite ends of the frame cross-bars 32 and 36 can be connected to the longitudinally extending frame members 38L, 38R.

Figure 3:
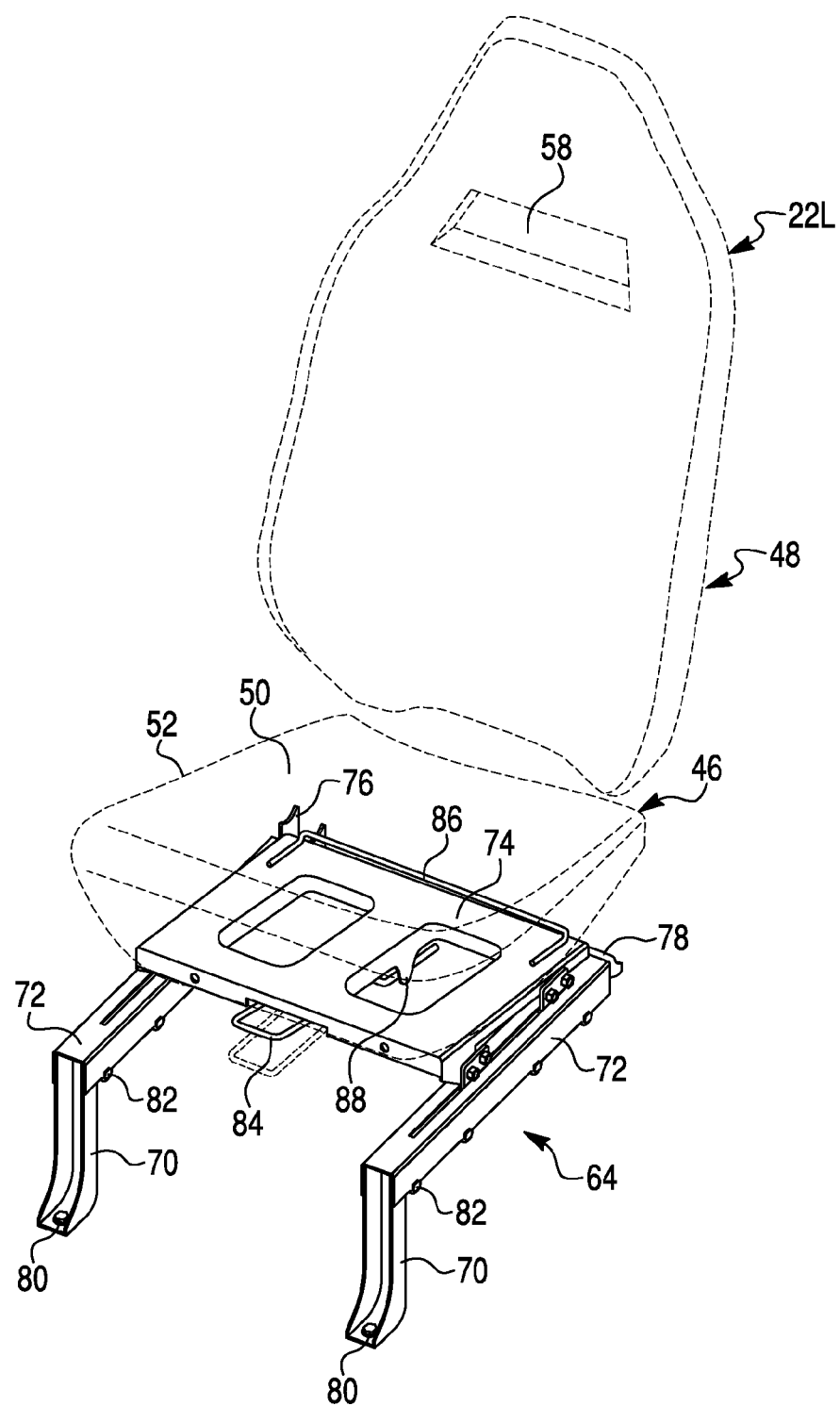
FIG. 3 is a perspective view of the exemplary seat adjustment mechanism of FIG. 2, with portions of a vehicular seat in phantom.

A bottom of each of the support legs 70 can be resiliently connected to an upper surface of the frame cross-bar 32, such that the frame cross-bar 32 supports the support legs 70, and thereby also supports the rails 72, mounting plate 74 and seat 22L. As shown in FIG. 3, the support legs 70 can be connected to the frame cross-bar 32 by bolts 80. Other components of the seat slider assembly 64 can also be connected to the vehicle frame 34. For example, rear ends of the rails 70 can be connected to the vehicle frame 34 by mounts 76 and 78.

The seat slide assembly 64, and thereby the seat 22L, can also be supported by the vehicle frame 34 and/or other vehicular structural elements via a rear seat mount assembly 40. The rear seat mount assembly 40 can include a rear cross-bar support member 42 that can be connected to a lower surface of one or more components of the seat slider assembly 64 at or near its rear end. In some of these embodiments, the cross-bar support member 42 is rigidly connected to a lower surface of each of the rails 72. The rear cross-bar support member 42 can be connected to the vehicle frame 34 or other vehicular structural element(s), such as via one of more rear vertical support members 44.

The seat slider assembly 64 (and thus the seat 22L) can thereby be securely connected to the vehicle frame 34 via connections between: 1) the support legs 70 and the frame cross-bar 32; 2) the vehicle frame 34 and mounts 76 and 78; and 3) the rear seat mount assembly 40, components of the seat slider assembly 64, and the rear vertical support member(s) 44. However, as indicated above, embodiments are intended to include or otherwise be used with any other relevant seat attachment configurations, etc.

IV. Seat Adjustment Assembly

FIG. 3 is a perspective view of the exemplary seat adjustment mechanism of FIG. 2, with portions of a vehicular seat in phantom; FIG. 4 is a perspective view of the exemplary seat adjustment mechanism of FIG. 2 in a relatively rearward position; and FIG. 5 is a perspective view of the exemplary seat adjustment mechanism of FIG. 2 in a relatively forward position.

As shown in FIGS. 3-5, each of the rails 72 defines a slot 96. Sliding brackets 90, which are connected to sides of the mounting plate 74 via bolts 98, extend within the slots 96 so as to be movable along the slots 96 in the longitudinal direction of the vehicle 10. Movement of the brackets 90 results in longitudinal movement of the mounting plate 74 (and thereby the seat 22L) by virtue of the sliding brackets 90 being connected to the mounting plate 74.

As shown in FIG. 4, the mounting plate 74 reaches its maximum rearward position when the rear sliding brackets 90 abut a rear end of the slot 96. Similarly, as shown in FIG. 5, the mounting plate 74 reaches its maximum forward position when the forward sliding brackets 90 abut a front end of the slot 96. The cooperation between these elements that enables the sliding movement of the brackets 90 and the mounting plate 74 along the slots 96 is discussed in more detail below.

The seat slider assembly 64 also includes a release handle 84 connected to the mounting plate 74, which cooperates with a release handle pivot 88 that is defined at a lower surface of the mounting plate 74, to lock the mounting plate 74 at certain longitudinally spaced positions within the range of movement of the sliding brackets 90 along the slots 96. The release handle 84 is manually actuable, such as by a passenger seated in the seat 22L, to lock and unlock the position of the sliding brackets 90, and thereby the mounting plate 74 and the seat 22L attached thereto.

FIGS. 3-5 show the release handle 84 in solid lines in the unlocked position, and the locked position in phantom. In some embodiments, the release handle 84 is normally in, or otherwise biased into, the locked position, which prevents the sliding brackets 90 from moving along the slots 96. However, a user can manually apply an upward force to the release handle 84 so as to occupy the space shown in solid lines, which unlocks the release handle 84 and allows the sliding brackets 90 to move along the slots 96. Releasing the upward force applied to the release handle 84 enables the release handle 84 to adopt the locked position to prevent the sliding brackets 90 from moving along the slots 96.

The operation of the release handle 84 and the release handle pivot 88 is discussed in more detail below referring to FIG. 6, which is a perspective view of components of the exemplary seat adjustment mechanism of FIG. 2, including support legs and rails; and FIG. 7, which is a perspective view of components of the exemplary seat adjustment mechanism of FIG. 2, including inner pipes and sliding brackets, with a mounting plate shown in phantom.

Figure 6:
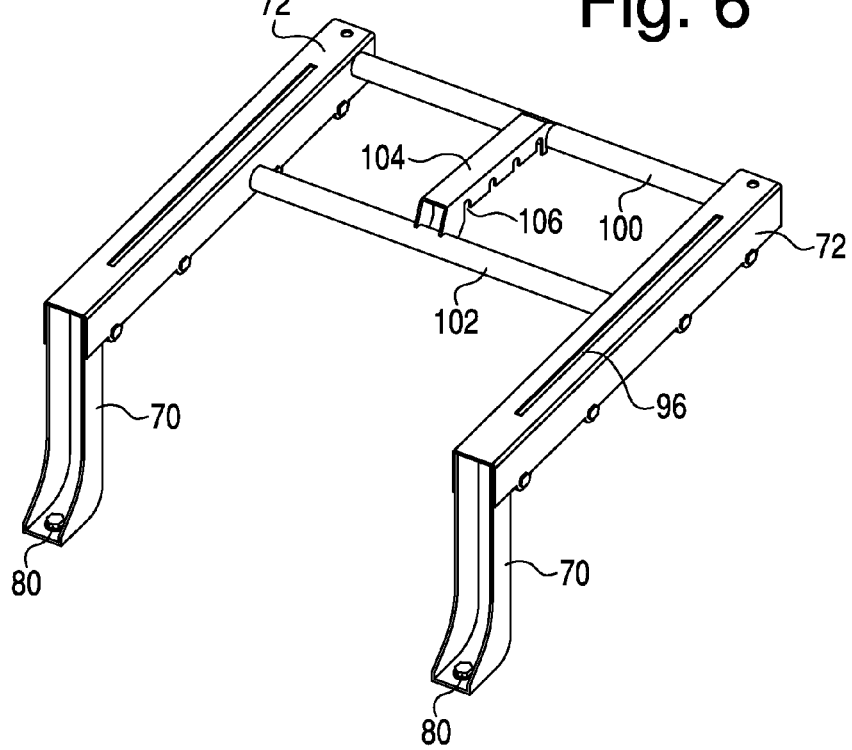
FIG. 6 is a perspective view of components of the exemplary seat adjustment mechanism of FIG. 2, including support legs and rails.

As shown in FIG. 6, a rear support bar 100 and a front support bar 102 extend perpendicular to and connect the rails 72. The rear support bar 100 is attached at interior surfaces of the rails 72 adjacent their rear ends. The front support bar 102 is attached at interior surfaces of the rails 72 at positions between their front and rear ends, such as at locations proximate their longitudinal midpoints.

An elongated lock bar 104 is connected to the rear and front support bars 100 and 102. A rear end of the lock bar 104 is rigidly secured to the rear support bar 100, and a front end of the lock bar 104 is rigidly secured to the front support bar 102. The lock bar 104 is oriented to extend parallel to the rails 72, and is disposed at a position at approximately a lateral midpoint between the rails 72. Notches 106 are defined along a lower surface of the lock bar 104. Each of the notches 106 defines a channel that extends perpendicular to the direction of elongation of the lock bar 104.

Figure 7:
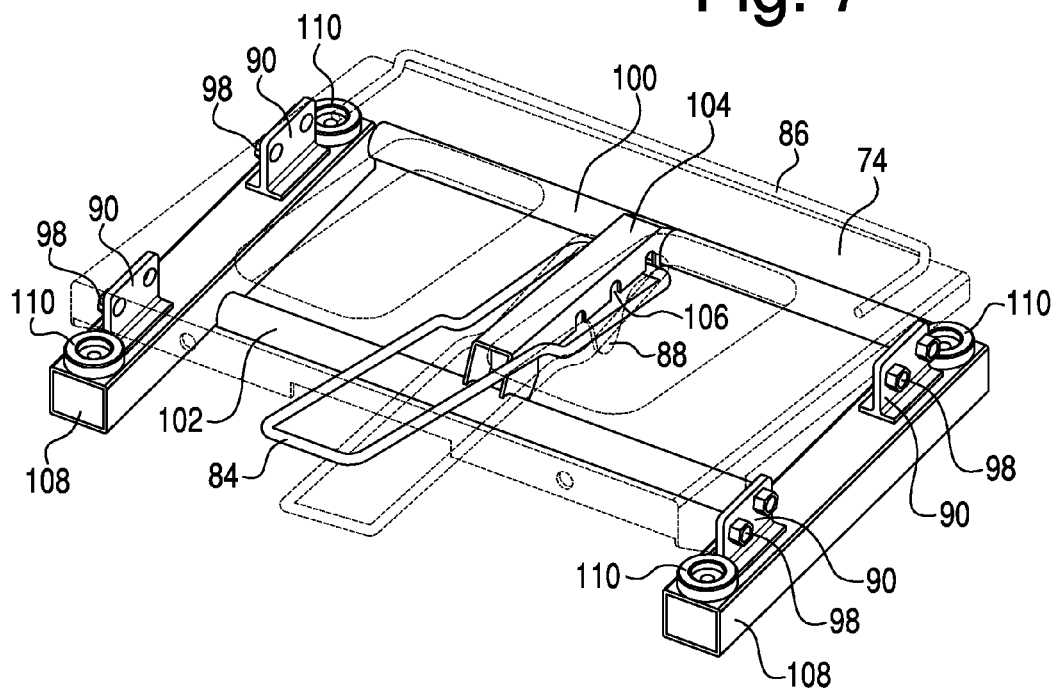
FIG. 7 is a perspective view of components of the exemplary seat adjustment mechanism of FIG. 2, including inner pipes and sliding brackets, with a mounting plate shown in phantom.

As shown in FIG. 7, the release handle 84 is pivotable about the release handle pivot 88 into and out of engagement with any of the notches 106. A rear end of the release handle 84, which extends parallel to the direction of extension of the channels of the notches 106, is configured to fit within any one of the notches 106.

Figure 9:
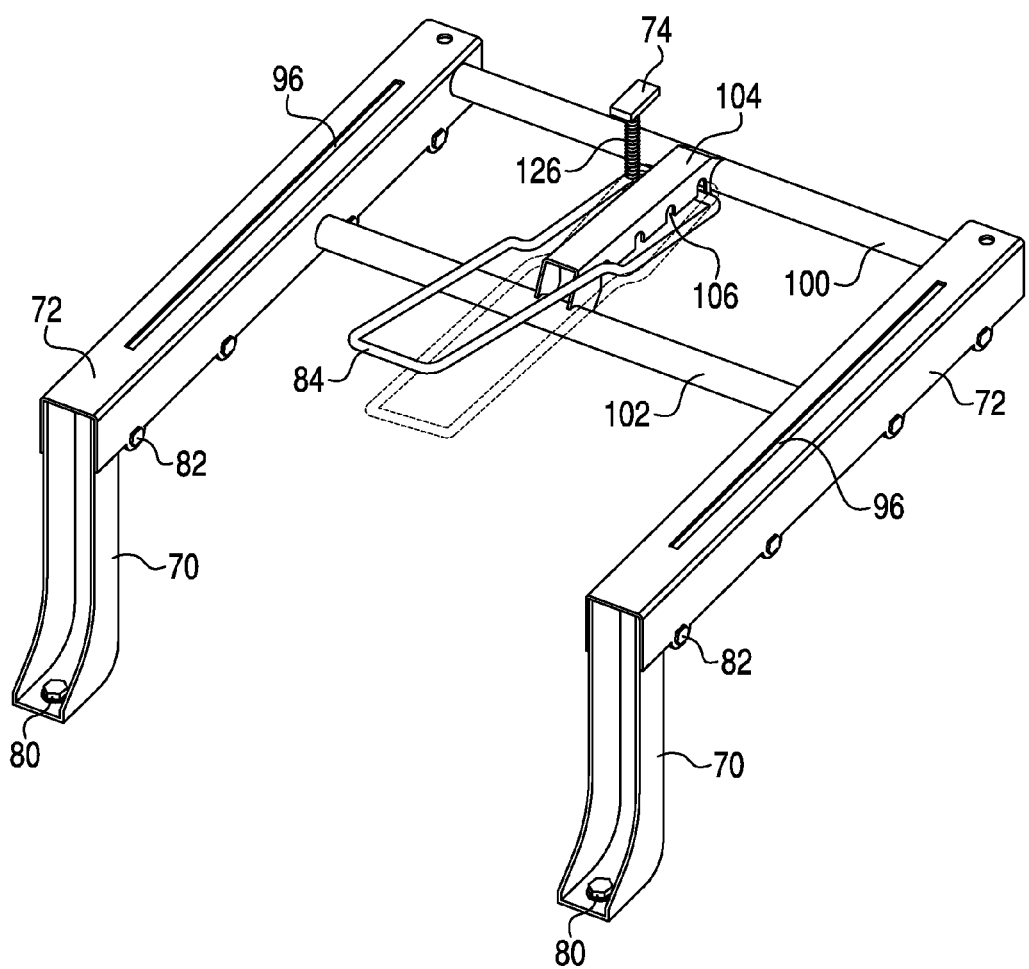
FIG. 9 is a perspective view of components of the exemplary seat adjustment mechanism of FIG. 2, including support legs, rails, a lock bar, and a release handle.

FIG. 9 is a perspective view of components of the exemplary seat adjustment mechanism of FIG. 2, including support legs, rails, a lock bar, and a release handle. FIG. 9 also shows a spring 126 that extends between a lower surface of the mounting plate 74 and an upper surface of the rear end of the release handle 84. The spring 126 applies an upward force to the release handle 84 so that the rear end is biased upwardly and the front end is biased downwardly, which biases the release handle 84 into the locked position.

Applying an upward force to the front end of the release handle 84, of a magnitude that is greater than the biasing force of the spring 126, causes the release handle 84 to pivot about the release handle pivot 88, and the rear end of the release handle 84 to move out of engagement with the notches 106. In this state, with the release handle 84 out of engagement with any of the notches 106, the sliding brackets 90 and mounting plate 74 are freely movable along the longitudinal direction of the slot 96. Releasing the upward force from the front end of the release handle 84 causes the release handle 84 to pivot about the release handle pivot 88 by virtue of the biasing force of the spring 126, and the rear end of the release handle 84 to move upwardly into engagement with one of the notches 106. In this state, with the release handle 84 in engagement with one of the notches 106, the sliding brackets 90 and mounting plate 74 are locked and not movable along the longitudinal direction of the slot 96.

As shown in FIG. 7, the sliding brackets are disposed and rigidly secured to upper surfaces of a pair of inner pipes 108. Each of the inner pipes is hollow, has a square cross-section, and extends within one of the rails 72. Embodiments are intended to include or otherwise cover any method or apparatus for securing the sliding brackets 90 to the upper surfaces of the inner pipes 108.

Stoppers 110 are rigidly secured to the upper surfaces of the inner pipes 108. The stoppers 110 are provided adjacent front surfaces of the front sliding brackets 90, and adjacent rear surfaces of the rear sliding brackets 90. The stoppers impede contact between the sliding brackets 90 and other components when the sliding brackets 90 are disposed at their most forwardly and rearwardly positions.

Figure 8:
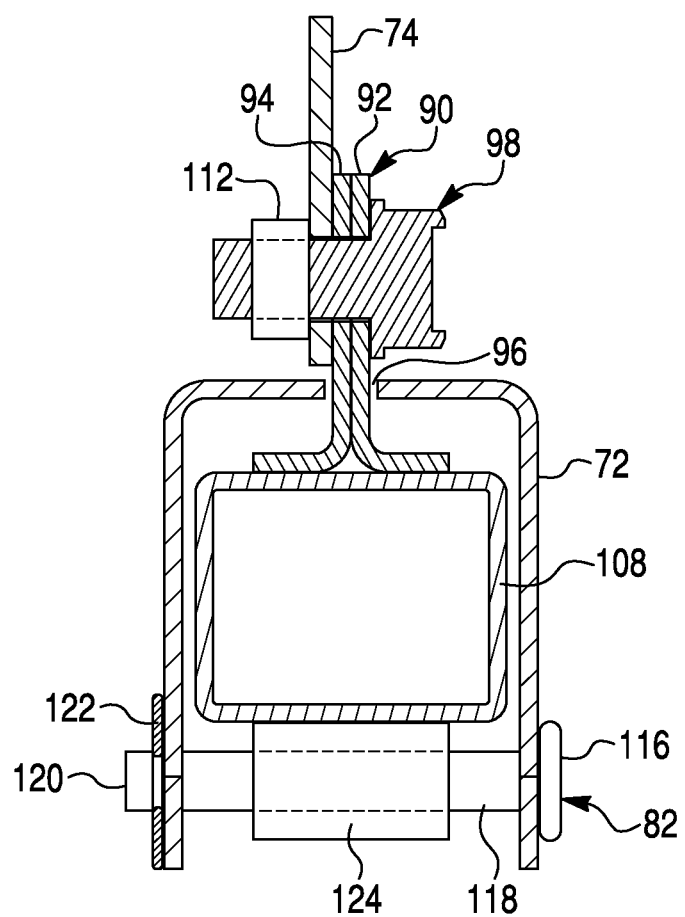
FIG. 8 is a cross-sectional view taken along line 8-8 shown in FIG. 4.

FIG. 8 is a cross-sectional view taken along line 8-8 shown in FIG. 4, and thereby shows the positional relationships between some of the components discussed above. For example, as shown in FIG. 8, each sliding bracket 90 includes two L-shaped plates 92, 94 that are secured together along their respective vertically extending portions. These vertically extending portions extend through the slot 96. Lower horizontally extending surfaces of the L-shaped plates 92, 94 are secured to the upper surface of the inner pipe 108. A bolt 98 and nut 112 assembly secures the vertically extending portions to the mounting plate 74. Thus, the mounting plate 74, sliding bracket 90 and inner pipe 108 form an integral assembly that is movable together within the rail 72 along the longitudinal direction of the slot 96.

Multiple pins 82 are provided adjacent a bottom of each of the rails 72, and extend in a direction perpendicular to a direction of extension of the rails 72. The pins 82 each include a head 116 adjacent an exterior surface of the associated rail 72, and an end 120 that extends beyond an opposite exterior surface of the rail 72. A locking device 122 is provided between the end 120 of the pin 82 and the adjacent exterior surface of the rail 72 to allow the pin 82 to rotate but otherwise lock the pin 82 in position. Embodiments are intended to include or otherwise cover any type of locking device, including but not limited to a cotton pin, lock washer, E-ring, etc.

Each pin 82 includes a shaft 118 that extends between the head 116 and the end 120. A roller 124 is coaxially disposed around the shaft 118 so as to be rotatable relative to the shaft 118. A lower surface of the inner pipe 108 rests on the roller 124, which enables the inner pipe 108 to be movable along the slot 96 based on the relatability of the roller 124. This structure enables the inner pipe 108, and thus the connected sliding bracket 90 and mounting plate 74, to travel along the slots 96 without the use of or need for bearings, grease, dust, etc.

The cross-section of each of the rails 72 generally defines a C-shape. For example, the rails 72 are each composed of three longitudinally extending plates, including two opposing side plates and an upper plate. The rails 72 do not include a bottom plate, and thus are each open at the bottom.

Providing rails 72 that are open at the bottom may be beneficial for various reasons. For example, dirt, mud, water, debris, etc., that may enter the hollow interior space of the rails 72, and thus contact components disposed therein, such as the roller 124, shaft of the pin 118, inner pipe 108, etc., tends to exit the hollow interior space by virtue of gravity. This removal of such dirt, mud, water, debris, dust, etc., thereby enables the mounting plate 74, sliding bracket 90, and inner pipe 108 to remain slideable along the rollers 124. Thus, longitudinal adjustment of the seat 22L is not impeded even if these components contact dirt, mud, water, debris, dust, etc.

Figure 10:
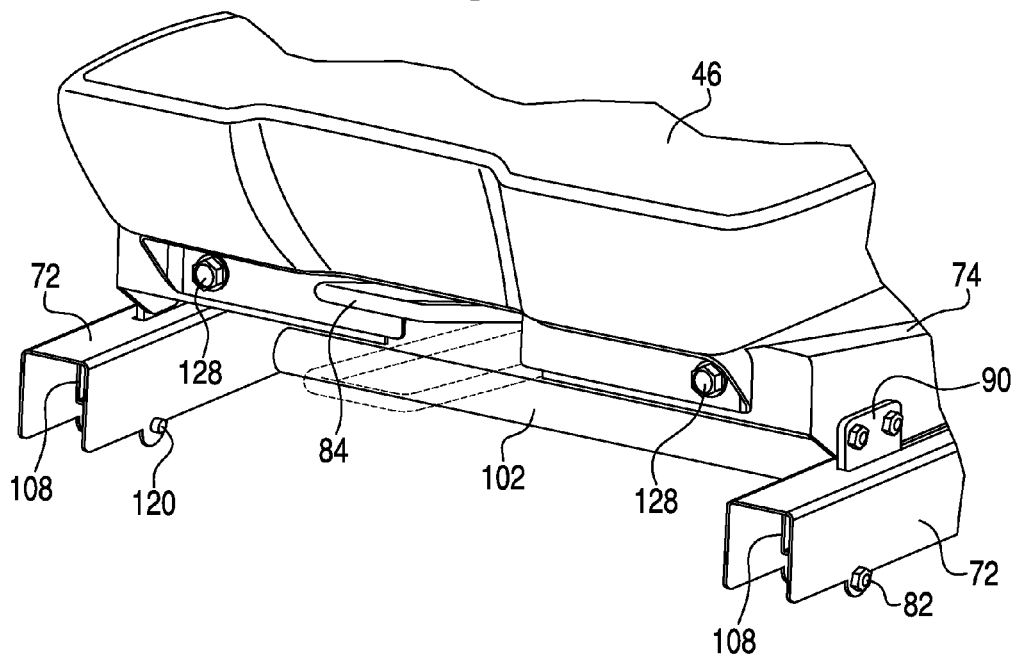
FIG. 10 is a front perspective view of the exemplary seat adjustment mechanism of FIG. 2.
Figure 11:
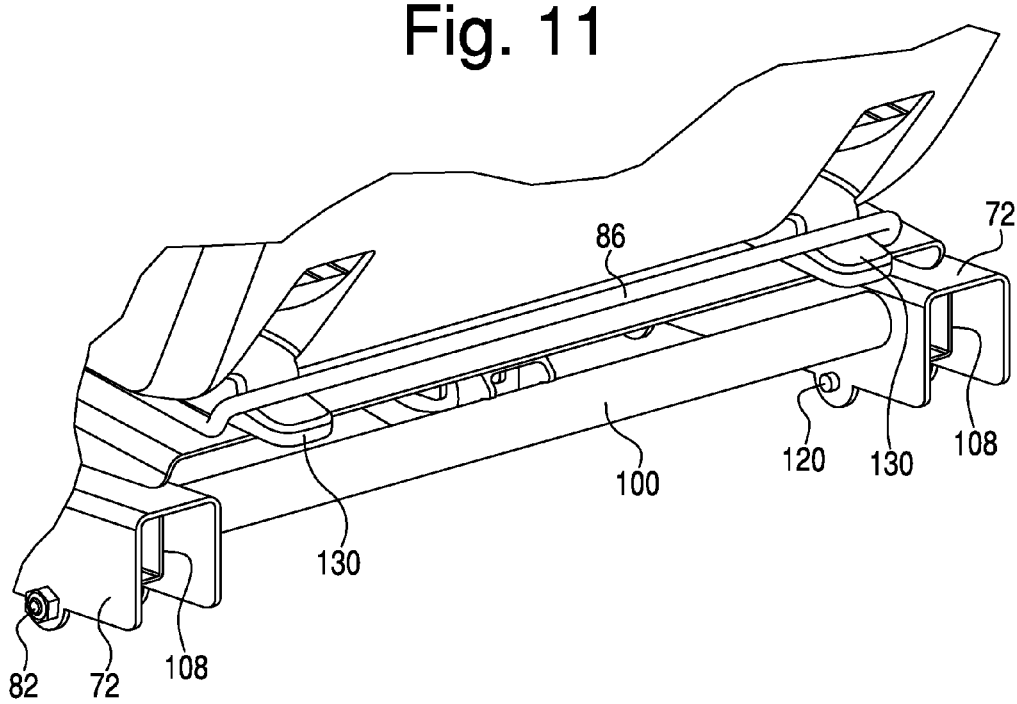
FIG. 11 is a rear perspective view of the exemplary seat adjustment mechanism of FIG. 2.

FIG. 10 is a front perspective view of the exemplary seat adjustment mechanism of FIG. 2; and FIG. 11 is a rear perspective view of the exemplary seat adjustment mechanism of FIG. 2.

FIG. 10 specifically shows the sliding brackets 90, and thus the mounting plate 74 and seat 22L, in the forward most position. Bolts 128 are provided to rigidly secure the seat slider assembly 64 to the seat 22L.

FIG. 11 specifically shows flanges 130 extending from the rear of the seat 22L. A rod 86, which is secured to, and extends beyond a rear surface of, the mounting plate 74, engages the flanges 130 to further secure the seat slider assembly 64 to the seat 22L.

V. Operation

In accordance with the operation of some of the disclosed embodiments, a passenger may apply an upward force to the front of the release handle 84 to move the rear end of the release handle 84 out of engagement with one of the notches 106. The release handle 84, as well as the mounting plate 74, sliding bracket 90 and inner pipe 108, are thereby placed in the unlocked state. This unlocked state continues for as long as the user maintains the upward force on the front of the release handle 84.

While in the unlocked state, a passenger may apply a force in the longitudinal direction of the vehicle to the seat 22L to move the seat 22L, as well as the mounting plate 74, sliding bracket 90 and inner pipe 108, longitudinally along the slot 96. This longitudinal movement is achieved based on the inner pipe 108 being supported by the rollers 124. Releasing the release handle 84 causes the rear end of the release handle 84 to engage one of the notches 106 of the lock bar 104, thereby locking the seat 22L in position.

Providing rails 72 that are open at the bottom may be beneficial for various reasons. For example, dirt, mud, water, debris, dust, etc., that enters the hollow interior space of the rails 72, and thus contacts components disposed therein, such as the roller 124, shaft of the pin 118, inner pipe 108, etc., tends to exit the hollow interior space by virtue of gravity. This removal of such dirt, mud, water, debris, dust, etc., enables the mounting plate 74, sliding bracket 90, and inner pipe 108 to remain slideable along the rollers 124, and thus longitudinal adjustment of the seat 22L is not impeded even under these conditions. In addition, the components disclosed above obviate use of bearings, grease, etc., that would otherwise be negatively affected by contact with the dirt, mud, water, debris, dust, etc.

VI. Alternative Embodiment of FIGS. 12-15

Figure 12:
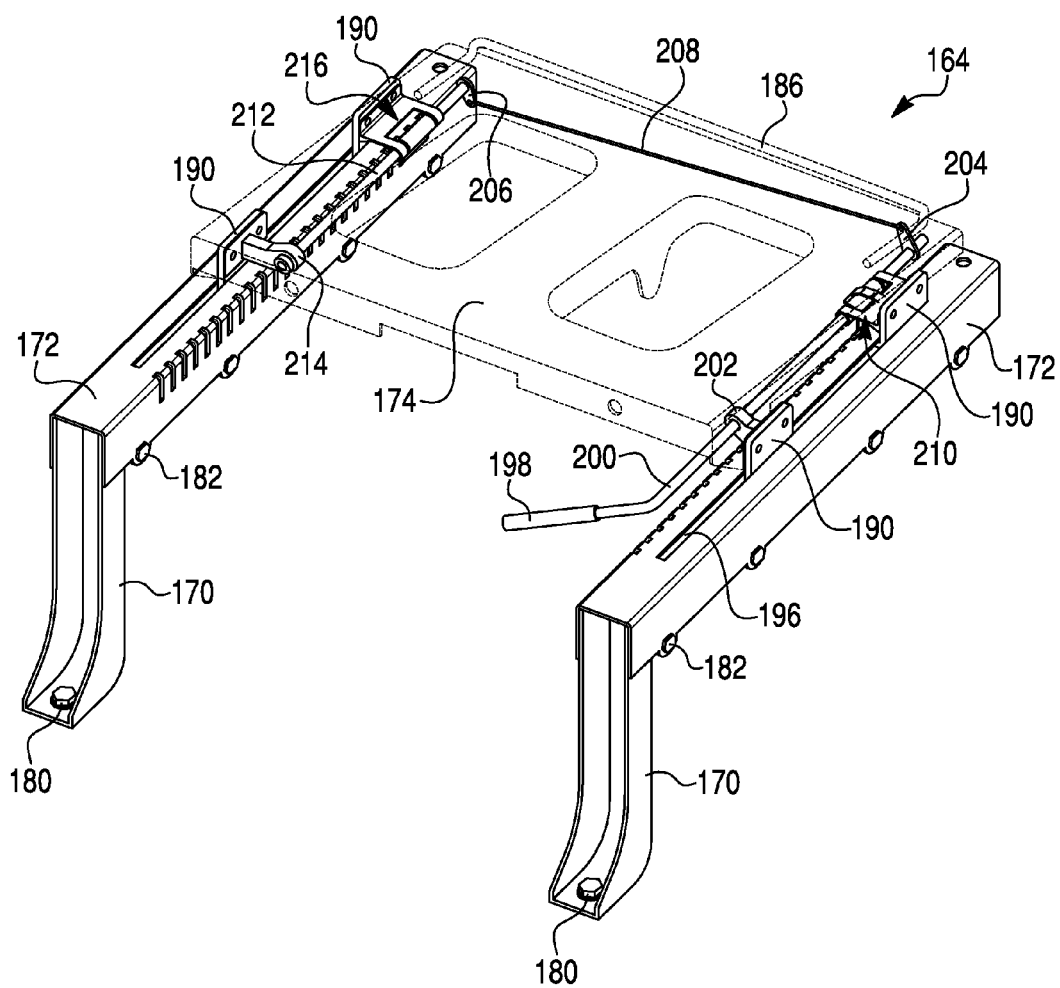
FIG. 12 is a perspective view of an alternative exemplary seat adjustment mechanism in accordance with the disclosed subject matter.
Figure 13:
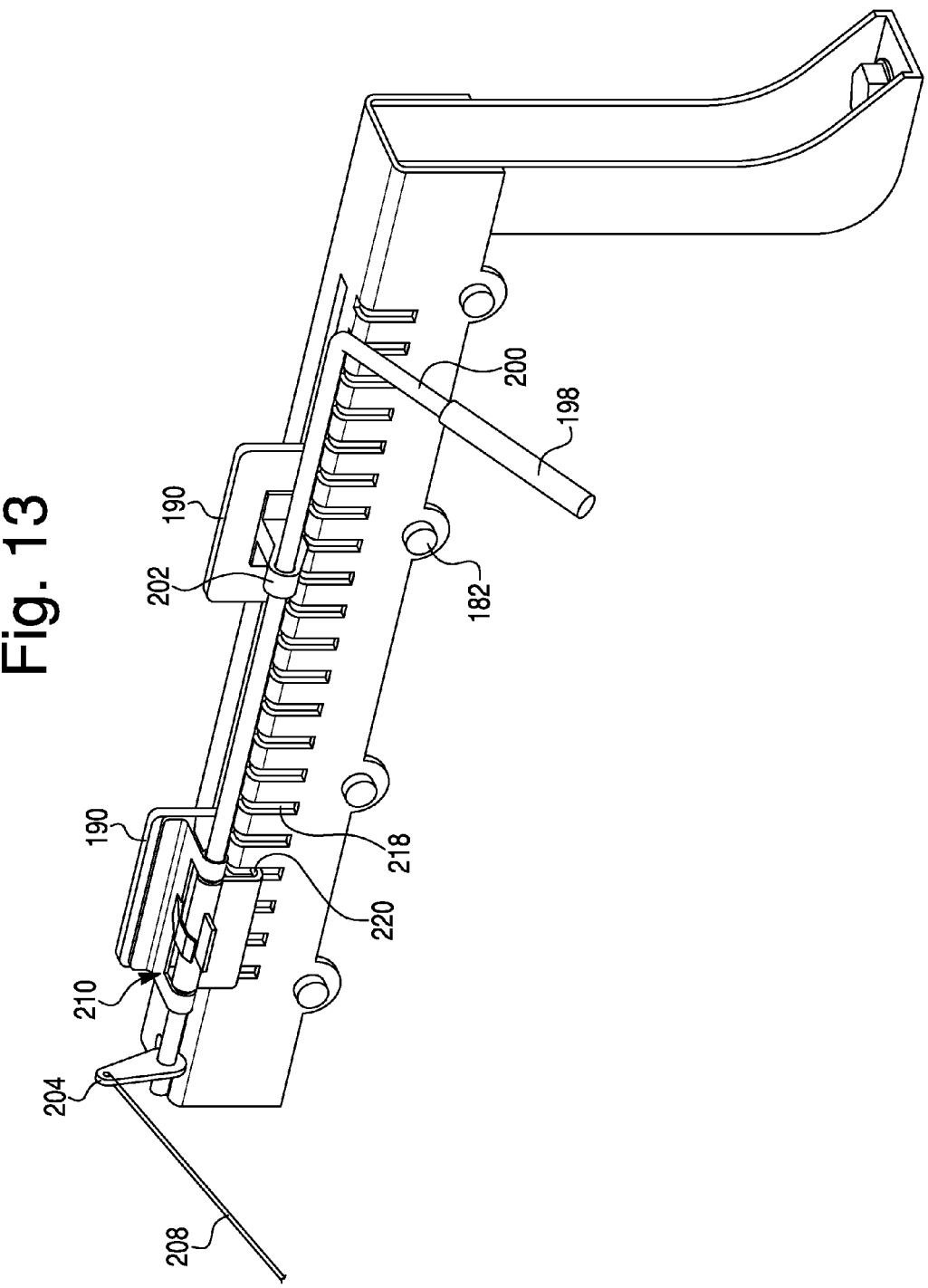
FIG. 13 is a perspective view of components of the exemplary seat adjustment mechanism of FIG. 12, including a support leg, rail, and locking mechanism.
Figure 14:
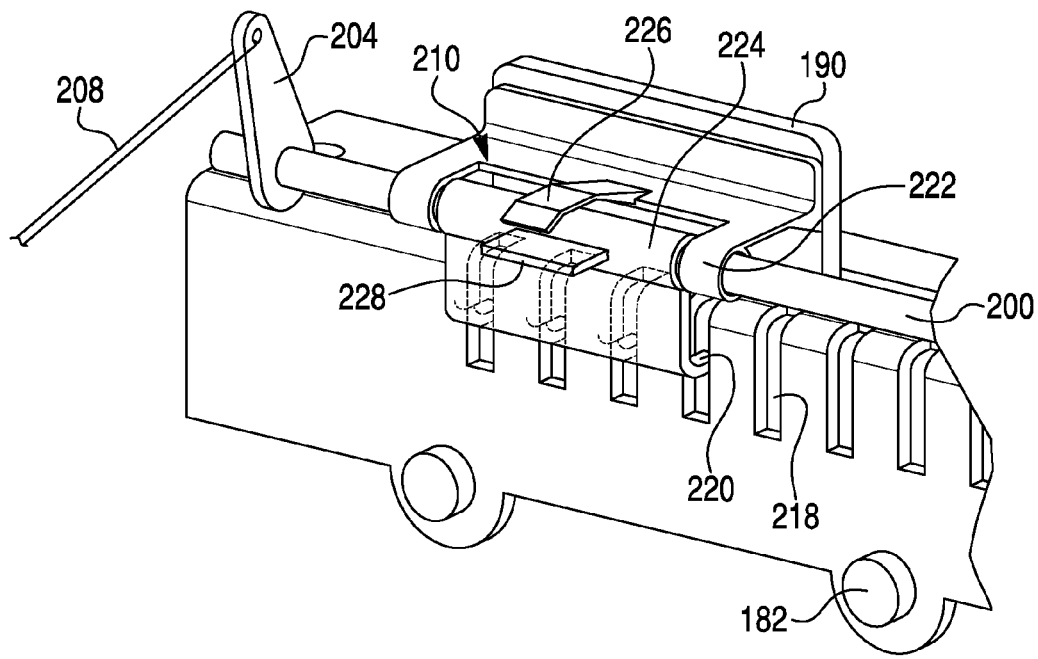
FIG. 14 is a perspective view of components of the exemplary seat adjustment mechanism of FIG. 12, including the locking mechanism in a locked state.
Figure 15:
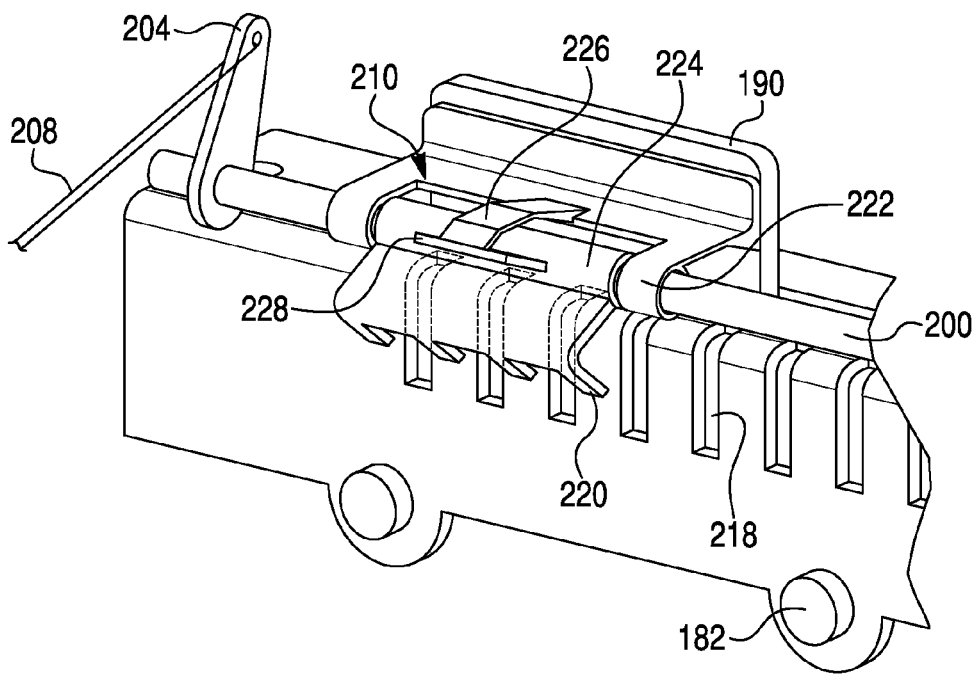
FIG. 15 is a perspective view of components of the exemplary seat adjustment mechanism of FIG. 12, including the locking mechanism in an unlocked state.

FIG. 12 is a perspective view of an alternative exemplary seat adjustment mechanism in accordance with the disclosed subject matter; FIG. 13 is a perspective view of components of the exemplary seat adjustment mechanism of FIG. 12, including a support leg, rail, and locking mechanism; FIG. 14 is a perspective view of components of the exemplary seat adjustment mechanism of FIG. 12, including the locking mechanism in a locked state; and FIG. 15 is a perspective view of components of the exemplary seat adjustment mechanism of FIG. 12, including the locking mechanism in an unlocked state. The embodiment of FIGS. 12-15 differs from the previously disclosed embodiment by virtue of its locking mechanism.

A shown in FIG. 12, the support assembly 164 includes a mounting plate 174, and a pair of rails 172 supported by a pair of supporting legs 170. Bolts 180 secure the supporting legs 170 to the vehicle frame or other relevant component(s). Sliding brackets 190 are movable along slots 196 defined in the upper surface of each rail 172. Pins 182 are provided adjacent the bottom of each rail to support rollers that enable the sliding brackets 190 and mounting plate 174 to travel longitudinally along the slots 196. A rod 186 is provided at the rear end of the mounting plate 174 to secure the mounting plate 174 to the seat 22L.

An alternative locking mechanism includes a manually actuable handle 198 connected to front end of a rod 200. The handle 198 and portion of the rod 200 disposed adjacent thereto extend at an angle relative to the remainder of the rod 200. The rod 200 is supported by rod supports 202 that support the remaining portion of the rod 200 in an orientation that is parallel to the longitudinally extending rails 172, and that enable rotation of the rod 200.

A crank 204 is provided adjacent a rear end of the rod 200. A linkage 208 connects the crank 204 to another crank 206 disposed at an opposite side of the support assembly 164. A rod 212 is attached to the crank 206, and the rod 212 is supported by a rod support 214 so that the rod 212 extends parallel to the rails 172 and is rotatable relative to the rod support 214. A locking mechanism 210 is provided at rod 200, and another locking mechanism 216 is provided at rod 212.

As shown in FIG. 13, an inner surface of the rails 172 is provided with slots 218, and the locking mechanism 210 includes teeth 220 that are configured to be disposed within the slots 218. As shown in FIG. 14, the locking mechanism 210 includes a supporting rod 222 that also supports the rod 200 so that the rod 200 is rotatable therein. A cylindrical portion 224 is fixed relative to the rod such that rotation of the rod 200 causes the cylindrical portion 224 to similarly rotate. The teeth 220 are unitary with or otherwise secured to cylindrical portion 224 so that rotation of the cylindrical portion 224 causes the teeth 220 to similarly rotate. The locking mechanism 216 has a structure that is similar to the structure disclosed above.

In operation, a passenger may grasp the handle 198 and rotate the rod 200, which causes the portions of the locking mechanisms 210 and 216 to rotate. For example, the teeth 220 are caused to rotate into and out of the slots 218. The support assembly 164 is in the locked condition when the teeth 220 are disposed within the slots 218, while the support assembly 164 is in the unlocked condition when the teeth 220 are not disposed within the slots 218.

The locking mechanisms 210 and 216 may also each be provided with a flange 226 and a stopping plate 228. The flange 226 and stopping plate 228 communicate to prevent rotation beyond a certain point. For example, as shown in FIG. 14, the flange 226 and stopping plate 228 are separated when the teeth 220 are disposed in the slots 218 (locked condition), while the flange 226 contacts the stopping plate 228 when the rod 200 is rotated into the unlocked condition.

VII. Other Alternative Embodiments

While certain embodiments of the invention are described above, and FIGS. 1-15 disclose the best mode for practicing the various inventive aspects, it should be understood that the invention can be embodied and configured in many different ways without departing from the spirit and scope of the invention.

The vehicle of FIGS. 1 and 2 can include four seats (while only one seat is illustrated in FIG. 2). Embodiments are intended to include or otherwise cover vehicles having any number of seats. For example, the disclosed seat adjustment mechanisms can be used for vehicular rear seats, seats on buses, trains, airplanes, etc. In fact, the disclosed seat adjustment mechanisms can even be used in non-vehicular applications.

The vehicle 10 of FIGS. 1 and 2 has four seats arranged in two rows. However, embodiments are intended to include or otherwise cover vehicles having any number of seats all arranged in a row, or all arranged in tandem, or arranged in any number of rows. Embodiments are intended to include or otherwise cover a single seat for each vehicle occupant, or a single seat for a plurality of vehicle occupants (also referred to as a bench seat).

The embodiments are disclosed in the context of vehicular seats for adults. However, the disclosed seat belt assemblies can also be used for seats specially designed or configured for infants, children, etc.

The seat slider assemblies 64 and 164 disclosed above enables the seat 22L to be adjusted along a longitudinal direction of the vehicle 10. However, embodiments are intended to include or otherwise cover other types of seat adjustments, such as tilting, etc.

Two different embodiments are specifically disclosed above that lock the sliding brackets 90 and 190 at different positions along the slots 96 and 196. However, embodiments are intended to include or otherwise cover any methods and apparatus for locking the sliding brackets 90 and 190 in place.

In the above embodiments, each of the inner pipes 108 is disclosed as being hollow, having a square cross-section, and extending within one of the rails 72. However, embodiments are intended to include or otherwise cover inner pipes having any shape or configuration that enables them to travel within the rails 72.

The rails 72 and 172 are disclosed above as being generally C-shaped in cross-section. However, embodiments are intended to include or otherwise cover rails having any configuration that facilitates some or all of the benefits disclosed above. For example, embodiments are intended to include any rail configuration that facilitates the removal of dirt, mud, water, debris, dust, etc., that would otherwise impede seat adjustments.

The embodiments are disclosed abo the in the context of manually adjustable vehicular seats. However, embodiments are intended to be used with automatically or electronically adjustable seats.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. Various aspects of these methods can be performed with or otherwise cover processors and computer programs implemented by processors.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A vehicular seat adjustment mechanism for facilitating positional adjustments of a vehicular seat along a longitudinal direction of a vehicle, the vehicle having a frame and defining a lower surface, the vehicular seat adjustment mechanism comprising:
    a pair of rails that extend substantially parallel to the longitudinal direction of the vehicle, each of the rails defining an opening that faces the lower surface of the vehicle, and each of the rails including at least one circular roller axially disposed along a transverse direction of the rail and configured to facilitate movement of the vehicular seat along the longitudinal direction of the vehicle during a vehicular seat adjustment;
    a pair of support legs that are configured to be secured to the vehicular frame, each of the support legs being secured to and supporting one of the rails;
    a mounting plate that supports the vehicular seat and that is configured to be movable along the pair of rails; and
    a pair of supports that are each secured to one of the rails and configured to support the mounting plate and facilitate longitudinal movement of the mounting plate along the rails.

2. A vehicular seat adjustment mechanism for facilitating positional adjustments of a vehicular seat along a longitudinal direction of a vehicle, the vehicle having a frame and defining a lower surface, the vehicular seat adjustment mechanism comprising:
    a pair of rails that extend substantially parallel to the longitudinal direction of the vehicle, each of the rails defining an opening that faces the lower surface of the vehicle;
    a pair of support legs that are configured to be secured to the vehicular frame, each of the support legs being secured to and supporting one of the rails;
    a mounting plate that supports the vehicular seat and that is configured to be movable along the pair of rails; and
    a pair of supports that are each secured to one of the rails and configured support the mounting plate and facilitate longitudinal movement of the mounting plate along the rails; wherein
    each of the rails includes three longitudinally extending plates, two of the plates defining opposing parallel sides, and one of the plates defining a top that connects an upper portion of the sides, and further including multiple sliding brackets that are each secured to the mounting plate, each of the sliding brackets including a pair of L-shaped plates that each define vertically extending portions that are secured together.

3. The vehicular seat adjustment mechanism according to claim 2, wherein the top of each of the rails defines a longitudinally extending slot, and the vertically extending portions of the L-shaped plates are configured and disposed to extend through one of the slots.

4. The vehicular seat adjustment mechanism according to claim 3, further including a pair of inner pipes, each of the inner pipes extending within one of the rails, wherein each of the L-shaped plates defines a horizontally extending portion that is secured to one of the inner pipes.

5. The vehicular seat adjustment mechanism according to claim 4, wherein each of the supports includes multiple pins that each extend though the opposing parallel sides of one of the rails, and multiple rollers, each roller being supported by and coaxial with one of the pins, each of the rollers being disposed so as to support one of the inner pipes.

6. The vehicular seat adjustment mechanism according to claim 2, further including a manually engagable locking mechanism for releasably locking the mounting plate to prevent it from being movable along the pair of rails.

7. The vehicular seat adjustment mechanism according to claim 6, wherein the locking mechanism includes a release handle and a lock bar that defines notches, the release handle being configured to be removably extendable within any one of the notches.

8. The vehicular seat adjustment mechanism according to claim 7, wherein the locking mechanism includes a spring that biases the handle into one of the notches.

9. The vehicular seat adjustment mechanism according to claim 6, wherein the locking mechanism includes a pair of manually rotatable rods that each extend parallel to one of the rails, multiple teeth, and slots defined in the rails, manual rotation of the rods moving the teeth into and out of engagement with the slots.

10. A vehicular seating and adjusting system for use with a vehicle having a frame and defining a lower surface and a longitudinal direction, the vehicular seating and adjusting system comprising:
   a vehicular seat;
   a pair of rails that extend substantially parallel to the longitudinal direction of the vehicle, each of the rails defining an opening that faces the lower surface of the vehicle;
   a pair of support legs that are configured to be secured to the vehicular frame, each of the support legs being secured to and supporting one of the rails;
   a mounting plate that supports the vehicular seat and that is configured to be movable along the pair of rails; and
   a pair of supports that are each secured to one of the rails and configured to support the mounting plate and facilitate longitudinal movement of the mounting plate along the rails; wherein each of the rails includes three longitudinally extending plates, two of the plates defining opposing parallel sides, and one of the plates defining a top that connects an upper portion of the sides, and further including multiple sliding brackets that are each secured to the mounting plate, each of the sliding brackets including a pair of L-shaped plates that each define vertically extending portions that are secured together.

11. The vehicular seating and adjusting system according to claim 10, wherein the top of each of the rails defines a longitudinally extending slot, and the vertically extending portions of the L-shaped plates are configured and disposed to extend through one of the slots.

12. The vehicular seating and adjusting system according to claim 11, further including a pair of inner pipes, each of the inner pipes extending within one of the rails, wherein each of the L-shaped plates defines a horizontally extending portion that is secured to one of the inner pipes.

13. The vehicular seating and adjusting system according to claim 12, wherein each of the supports includes multiple pins that each extend though the opposing parallel sides of one of the rails, and multiple rollers, each roller being supported by and coaxial with one of the pins, each of the rollers being disposed so as to support one of the inner pipes.

14. The vehicular seating and adjusting system according to claim 10, further including a manually engagable locking mechanism for releasably locking the mounting plate to prevent it from being movable along the pair of rails.

15. The vehicular seating and adjusting system according to claim 14, wherein the locking mechanism includes a release handle and a lock bar that defines notches, the release handle being configured to be removably extendable within any one of the notches, the locking mechanism also including a spring that biases the handle into one of the notches.

16. The vehicular seating and adjusting system according to claim 14, wherein the locking mechanism includes a pair of manually rotatable rods that each extend parallel to one of the rails, multiple teeth, and slots defined in the rails, manual rotation of the rods moving the teeth into and out of engagement with the slots.

17. A method of manufacturing a vehicular seat adjustment mechanism that is configured to facilitate positional adjustments of a vehicular seat along a longitudinal direction of a vehicle, the vehicle having a frame and defining a lower surface, the method comprising:
   extending a pair of rails substantially parallel to the longitudinal direction of the vehicle;
   configuring each of the rails to define an opening that faces the lower surface of the vehicle;
   securing a pair of support legs to the vehicular frame;
   supporting the rails with the support legs;
   supporting the vehicular seat with a mounting plate that is configured to be movable along the pair of rails;
   securing each of a pair of supports to one of the rails;
   configuring the supports to support the mounting plate and to facilitate longitudinal movement of the mounting plate along the rails
   providing, for each rail, three longitudinally extending plates, two of the plates defining opposing parallel sides, and one of the plates defining a top that connects an upper portion of the sides, and
   securing multiple sliding brackets to the mounting plate, each of the sliding brackets including a pair of L-shaped plates that each define vertically extending portions that are secured together.

\* \* \* \* \*